(12) United States Patent
van den Dungen et al.

(10) Patent No.: US 12,229,297 B2
(45) Date of Patent: Feb. 18, 2025

(54) TECHNIQUES FOR BACKWARDS COMPATIBILITY IN AN IDENTITY MANAGEMENT CLOUD SERVICE

(71) Applicant: Oracle International Corporation, Redwood Shores, CA (US)

(72) Inventors: Martinus Petrus Lambertus van den Dungen, Snohomish, WA (US); James William Salmon, Redmond, WA (US); Girish Nagaraja, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 302 days.

(21) Appl. No.: 17/953,058

(22) Filed: Sep. 26, 2022

(65) Prior Publication Data

US 2023/0098484 A1 Mar. 30, 2023

Related U.S. Application Data

(60) Provisional application No. 63/250,762, filed on Sep. 30, 2021.

(51) Int. Cl.
*H04L 29/06* (2006.01)
*G06F 21/62* (2013.01)

(52) U.S. Cl.
CPC ............... *G06F 21/6218* (2013.01)

(58) Field of Classification Search
CPC ..... G06F 21/6218; G06F 21/604; G06F 21/45
See application file for complete search history.

(56) References Cited

U.S. PATENT DOCUMENTS

| | | | |
|---|---|---|---|
| 7,657,639 | B2 | 2/2010 | Hinton |
| 9,781,122 | B1 | 10/2017 | Wilson et al. |
| 9,838,376 | B1 | 12/2017 | Lander et al. |
| 10,255,061 | B2 | 4/2019 | Lander et al. |
| 10,341,410 | B2 | 7/2019 | Lander et al. |
| 10,425,386 | B2 | 9/2019 | Wardell et al. |
| 10,454,940 | B2 | 10/2019 | Lander et al. |
| 10,484,243 | B2 | 11/2019 | Cole et al. |

(Continued)

OTHER PUBLICATIONS

Li, K., "Setup Multiple Identity Providers for SAP Analytics Cloud," SAP Community Blog Post, Jun. 14, 2021. https://blogs.sap.com/2021/06/14/setup-multiple-identity-providers-for-sap-analytics-cloud/.

(Continued)

*Primary Examiner* — William A Corum, Jr.
(74) *Attorney, Agent, or Firm* — Kilpatrick Townsend & Stockton LLP

(57) ABSTRACT

Techniques are disclosed for unifying a first identity management service with a second identity management service within a distributed computing system. The first identity management service can receive a request to perform an entity operation. The request may be formatted for an interface of the first identity service. The first identity service can determine that the account is in a second domain associated with the second identity service and transform the request to a format corresponding to an interface of the second identity service. The transformed request may be transmitted to the second identity service using an external proxy and based in part on the second domain corresponding to the second identity service.

20 Claims, 13 Drawing Sheets

(56) References Cited

U.S. PATENT DOCUMENTS

| | | |
|---|---|---|
| 10,484,382 B2 | 11/2019 | Wilson et al. |
| 10,511,589 B2 | 12/2019 | Gangawane et al. |
| 10,594,684 B2 | 3/2020 | Bansal et al. |
| 10,616,224 B2 | 4/2020 | Subramanian et al. |
| 10,715,564 B2 | 7/2020 | Mohamad Abdul et al. |
| 10,798,165 B2 | 10/2020 | Srinivasan et al. |
| 10,846,390 B2 | 11/2020 | Subramanian et al. |
| 10,878,079 B2 | 12/2020 | Vepa et al. |
| 10,931,656 B2 | 2/2021 | Carru et al. |
| 11,061,929 B2 | 7/2021 | Xu et al. |
| 11,165,634 B2 | 11/2021 | Medam et al. |
| 11,308,132 B2 | 4/2022 | Srinivasan et al. |
| 11,321,343 B2 | 5/2022 | Srinivasan et al. |
| 2008/0104250 A1 | 5/2008 | Vanuykhin et al. |
| 2015/0215348 A1 | 7/2015 | Koeten et al. |
| 2017/0302676 A1* | 10/2017 | Biswas .................. G06F 21/31 |
| 2017/0324746 A1 | 11/2017 | Kurian et al. |
| 2020/0264860 A1 | 8/2020 | Srinivasan et al. |
| 2021/0081252 A1 | 3/2021 | Bhargava et al. |
| 2021/0084031 A1 | 3/2021 | Lao et al. |

OTHER PUBLICATIONS

Jones, D., "Advance Your Modernize IAM Program with ForgeRock's New Accelerators," ForgeRock Blog, Mar. 11, 2020, 23 2 pages. https://www.forgerock.com/blog/advance-your-modernize-iam-program-forgerocks-new-accelerators.

"Modernize IAM Accelerators for Life Sciences," ForgeRock, 4 pages. https://www.forgerock.com/resources/view/122674262/overview/modernize-iam-accelerators-life-sciences.pdf.

"Migrate users to Azure AD B2C," Jan. 20, 2023. https://docs.microsoft.com/en-us/azure/active-directory-b2c/user-migration.

"AWS Identity and Access Management (IAM) FAQs." https://aws.amazon.com/iam/faqs/.

"Migrating from legacy IAM to modern Access Management: Guidelines and Best Practices," Thales White Paper, 12 pages. https://www.exclusive-networks.com/nl/wp-content/uploads/sites/21/2020/12/WP_Migrating_from_IAM_WP_A4_v4.pdf.

* cited by examiner

TECHNIQUES FOR BACKWARDS COMPATIBILITY IN AN IDENTITY MANAGEMENT CLOUD SERVICE

CROSS-REFERENCE TO RELATED APPLICATIONS

This application is a non-provisional of, and claims priority to, U.S. Provisional Patent Application 63/250,762, filed Sep. 30, 2021, the contents of which are incorporated herein by reference in their entirety for all purposes.

BACKGROUND

A cloud service provider (CSP) may provide multiple cloud services to subscribing customers. These services are provided under different models including a Software-as-a-Service (SaaS), Platform-as-a-Service (PaaS), an Infrastructure-as-a-Service (IaaS) model, and others. Within a cloud computing environment, the different service models may have different identity management services to provide user access control to various resources. As more and more services shift to a cloud-based model, it can be desirable to unify different identity management services to provide a secure and streamlined access control mechanism.

BRIEF SUMMARY

Embodiments of the present disclosure relate to providing backwards compatibility for a first identity service after a distributed computing system migrates identity management resources to a second identity service. More particularly, some embodiments provide methods, systems, and computer-readable media that implement a compatibility layer within the control plane of the first identity service. The compatibility layer may be configured to transform a request to perform an entity operation (e.g., create a user) from an interface specification for the first identity service (e.g., a legacy API) to an interface specification for the second identity service (e.g., System for Cross-domain Identity Management or SCIM). In addition, the compatibility layer may be configured to implement an on-behalf-of token technique, an idempotency check technique, and retry with exponential backoff technique for the received requests.

One embodiment is directed to a method performed by a first identity service in a distributed computing system. The first identity service may receive a request to perform an entity operation. The request may be from a user of the distributed computing system or another actor associated with an account of the distributed computing system. The entity operation can be associated with an entity and can include creating a new user, creating a group, deleting a user, or other similar operation for managing resources (e.g., entities) in an identity management service. The request may be formatted for an interface of the first identity service. For example, the request may be an API call for a legacy API of the first identity service. The first identity service can determine whether the entity is associated with a first domain corresponding to the first identity service or associated with a second domain corresponding to the second identity service. If the entity is associated with the second domain, the first identity service can transform the request to a format suitable for a second identity service. For example, the first identity service can transform the request from the legacy API call to a SCIM call (e.g., a transformed request). The first identity service may send the transformed request to the second identity service. The second identity service may then act on the transformed request, including performing the entity operation contained in the request.

Another embodiment is directed to a distributed computing system including one or more processors and one or more memories storing computer-executable instructions that, when executed by the one or more processors, cause the distributed computing system to receive, a request to perform an entity operation. The entity operation can be associated with an entity in a first domain corresponding to the first identity service or a second domain corresponding to the second identity service. The request may be in a first format according to a first interface of the first identity service (e.g., a legacy API), such that the request may be a legacy API call of the first identity service. The first identity service may then determine whether the entity is in the second domain. The second domain may be an object of the first identity service that represents user resources stored with the second identity service. If the account is in the second domain (e.g., the identity resources associated with the account are stored and managed by the second identity service), the first identity service can transform the request from the first format to produce a transformed request in a second format according to a second interface of the second identity service (e.g., the transformed request may be a SCIM call to the second identity service). The first identity service can send the transformed request to the second identity service to perform the entity operation.

In some embodiments, the first identity service can create a token associated with the account. The token may be an "on-behalf-of" (OBO) token that specifies the user, customer, account, or other agent providing the request. The OBO token can be sent, along with the transformed request, to the second identity service. When resolving the transformed request, the second identity service may send an authorization request to the first identity service. The authorization request can include a second token. The first identity service can compare the second token with the OBO token sent with the transformed request to verify that the agent submitting the request is authorized to request the entity operation. If the agent is authorized, the first identity service can send an indication to the second identity service that the request is authorized.

In some embodiments, the first identity service communicates with the second identity service via an external proxy. The first identity service may store and maintain an allowed list of URLs or other resource addresses that identify the domain and point to the second identity service.

In some embodiments, the entity operation can include creating a new user associated with the account. The request can also include a uniqueness token (e.g., an idempotency token) that can uniquely identify the requested new user (or other entity, request output, identity resource, etc.) within the first identity service. The first identity service can send a verification request to the second identity service that includes the uniqueness token. The verification request can be for the second identity service to check whether the requested new user already exists within the second identity service. If the new user does not exist, the second identity service may create the new user and send a verification indication back to the first identity service that the new user was successfully created by the second identity service. The uniqueness token may be stored by the first identity service.

The first identity service may receive a second request to perform a second entity operation. The second request can include a second uniqueness token. The second entity operation can include creating the new user account (e.g., the second request can be an attempt to create a user account that already exists). The first identity service can compare the second uniqueness token with the stored uniqueness token to determine whether the two tokens are the same (e.g., indicating that the new user has been previously created). If the two tokens are the same, the first identity service may provide a second indication that the new user already exists.

DETAILED DESCRIPTION

Figure 1:
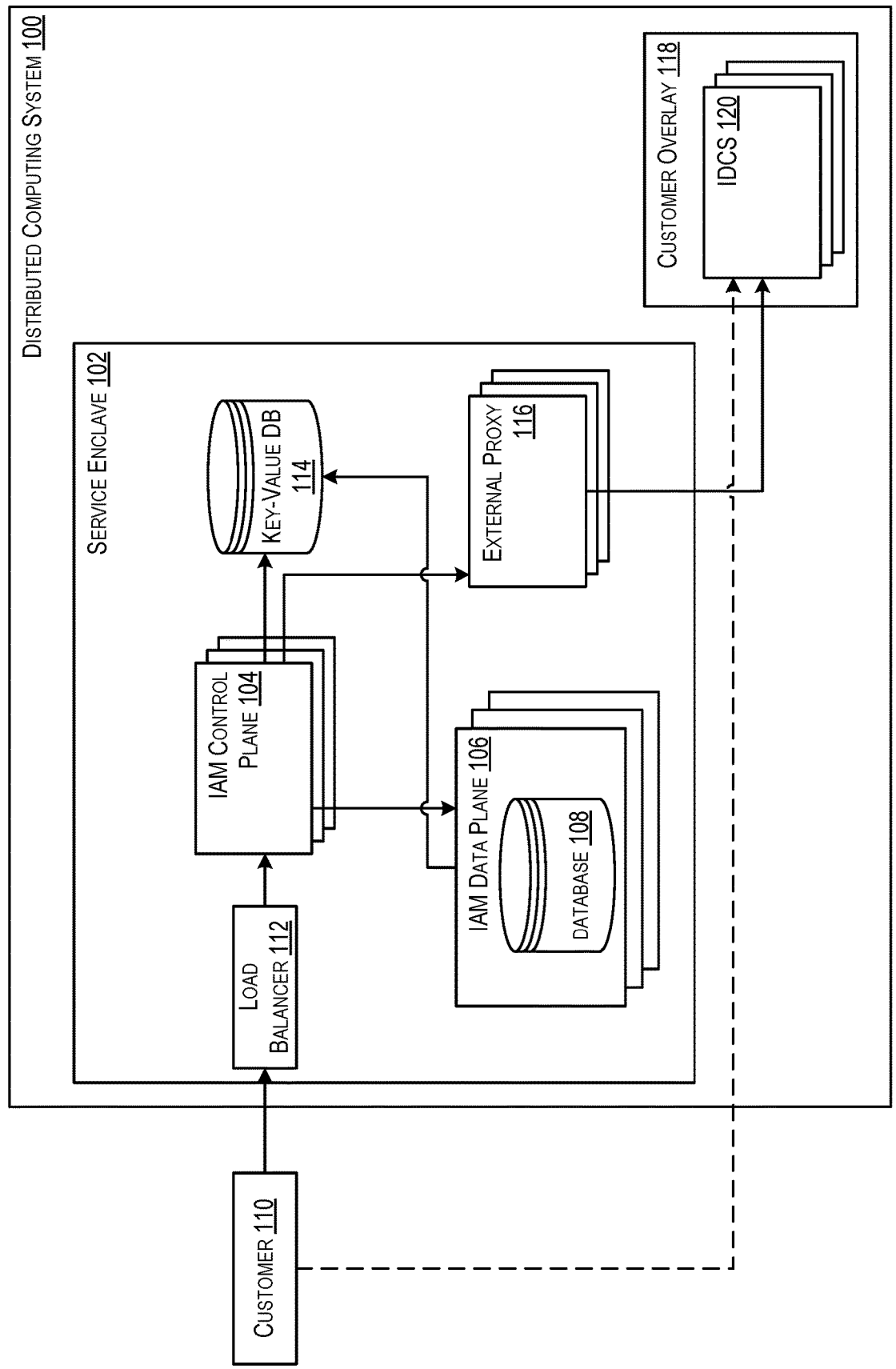
FIG. 1 depicts a distributed computing system implementing an identity and access management service and an identity cloud service, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

A cloud service provider (CSP) may provide multiple cloud services to subscribing customers. These services may be provided under different models including a Software-as-a-Service (SaaS), Platform-as-a-Service (PaaS), an Infrastructure-as-a-Service (IaaS) model, and others.

In the cloud environment, an identity management system is generally provided by the CSP to control user access to resources provided or used by a cloud service. Typical services or functions provided by an identity management system include, without restriction, single sign-on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premises resources. Each resource is typically identified by a unique identifier (e.g., an ID) that is assigned to the resource when the resource is created.

A CSP may provide two or more separate and independent identity management systems for their cloud offerings. This may be done, for example, where a first identity management system, service, or platform (e.g., Infrastructure Identity and Access Management (IAM)) may be provided for controlling access to cloud resources for IaaS applications and services provided by the CSP. Separately, a second identity management system, service, or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer generally has two separate accounts—one account with IAM for the IaaS subscription and a separate account with IDCS for the PaaS/SaaS subscription. Each account will have its own credentials, such as user login, password, etc. The same customer thus has two separate sets of credentials for the two accounts. This results in an unsatisfactory customer experience. Additionally, having two separate identity management system also creates obstacles for interactions between SaaS/PaaS and IaaS services.

For purposes of this application, and as an example, the two platforms are referred to as IAM and IDCS. These names and terms are however not intended to be limiting in any manner. The teachings of this disclosure apply to any situation where two (or more) different identity management systems are to be integrated. The identity management systems, services, or platforms to be integrated may be provided by one or more CSPs.

In certain embodiments, an integrated identity management platform (referred to as Integrated Identity Management System (IIMS)) is provided that integrates the multiple identity management platforms (e.g., IAM and IDCS platforms) in a manner that is transparent to the users or customers of the cloud services while retaining and offering the various features and functionalities offered by the two separate (e.g., IAM and IDCS) platforms. The integration thus provides a more seamless and enhanced user experience.

This integration however is technically very difficult for several reasons. The two platforms may use different procedures and protocols for implementing the identity-related functions. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that do not have "approved" characteristics as defined by an organization's security policies. On the other hand, IDCS may be a role-based access control (RBAC) system which is a policy-neutral access-control mechanism defined around roles and privileges. The components of RBAC such as role-permissions, user-role and role-role relationships make it simple to perform user assignments. As yet another reason, the authentication and authorization frameworks or workflows (e.g., types of tokens that are used, different authentication frameworks such as OAUTH, etc.) used by the two platforms may be different. This is just a small sampling of reasons why providing an integrated solution is technically very difficult.

Backwards Compatibility

In the IAM system (that is, a first identity service), a single database may contain all IAM data, including users, groups and dynamic groups (DGs), for a region. IAM control plane API calls are used to perform entity operations including creating users, creating groups, adding users to groups, etc. The migration to the unified IAM/IDCS model will place a tenant's native users and native groups (and other entities) into a default IDCS domain. In the IIMS, tenancies will be able to have multiple IDCS domains. A domain is an IAM entity representing an IDCS stripe (a collection of IDCS entities) and including the IDCS stripe metadata. For clarity, the term "type-one domain" is used herein to refer to this type of domain, e.g., a domain representing an IDCS stripe.

Some existing customers may continue to use legacy IAM control plane API calls, typically due to automation or scripting. In the IIMS, these customers can access the legacy APIs unaware that users and groups have moved to IDCS (that is, a second identity service). In addition, certain tenancies necessary for region bootstrapping may continue to rely on calls to IAM control plane (since IDCS is not available during bootstrapping). Thus, a technique that will transform legacy IAM control plane API calls to IDCS calls for migrated tenants while preserving IAM control plane calls for IAM tenants is desirable.

To solve this problem, a backwards compatibility layer can be added to IAM control plane that can transform IAM control plane API calls to SCIM (and transform SCIM to legacy IAM control plane API) to provide backwards compatibility for legacy IAM control plane API users. The SCIM calls may be routed to the correct IDCS domain through an external proxy. The IDCS can reside in the Customer Overlay and is external to the service enclave hosting the IAM control plane. Thus, the external proxy can maintain an allow list of all permitted uniform resource locators (URLs) for communication from the IAM control plane. The identity data plane (IAM data plane) stores the URLs for the IDCS domains and can provide them to the IAM control plane.

Tenancies that remain in IAM (using a key value data store) receive IAM control plane calls as before. Users and groups for these tenancies are placed into a lightweight domain. A lightweight domain is an IAM entity, similar to a type-one domain, that includes data corresponding to users, groups, and other entities that are managed by IAM and not IDCS. For clarity and to distinguish from a type-one domain, the term "type-two domain" is used herein to refer to lightweight domains. The IAM control plane will identify whether a call corresponds to a type-two domain or a type-one domain. If a type-two domain, then the call can be handled by IAM control plane. If a type-one domain, the call can be transformed and passed to IDCS.

Merging the first identity service (e.g., IAM) and the second identity service (e.g., IDCS) with a backwards compatibility functionality provides numerous advantages over using a single identity service (for instance, IDCS alone) or implementing a new identity service. Existing customers with substantial automation (e.g., scripts, programs, etc.) for handling identity operations (e.g., entity creation, user account management, authorization/authentication policies, etc.) can avoid modifying the automation to comport with the requirements of the new identity service. Such modifications can lead to errors in the identity management, increased customer traffic for the distributed computing system when responding to improperly configured automation, and errors in entity management. The second identity service may use an application programming interface (API) based on a different standard than the first identity service. The techniques described herein allow the merged identity services to use features of both services' interface standards to correctly handle idempotency and request authorization, which can limit handling of unnecessary entity operations and improperly authorized operations.

Turning now to the figures, FIG. 1 depicts a distributed computing system 100 implementing an identity and access management (IAM) service and an identity cloud service (IDCS), according to at least one embodiment. The IAM service may be a first identity service, while the IDCS may be a second identity service. The distributed computing system 100 may be implemented within one or more data centers of a CSP and may include a computing cluster of connected nodes (e.g., computers, servers, virtual machines, etc.) that work together in a coordinated manner to handle various requests (e.g., identity management, entity creation, authorization/authentication, etc.) by any suitable number of tenants. A tenancy within the distributed computing system 100 may correspond to a customer (e.g., customer 110) of the CSP.

The distributed computing system 100 can include various systems, services, devices, and the like, including IAM control plane 104, IAM data plane 106, external proxy 116, and IDCS 120. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device). The distributed computing system 100 can also include various data stores, including database 108 and key-value database 114.

The IAM service may include IAM control plane 104, which, as a control plane, can represent the collection of software (applications, processes, tasks, etc.) within the distributed computing system 100 for configuring and managing the IAM data plane 106. The IAM control plane 104 may be contained in a service enclave 102 of the distributed computing system 100. The service enclave 102 may represent systems and networks within the distributed computing system 100 that have an enhanced security posture with respect to other systems and networks within the distributed computing system 100. For example, traffic (e.g., network traffic, requests, etc.) into and out of the service enclave 102 may be subject to specific routing to protect private network endpoints from exposure. As shown in FIG. 1, external proxy 116 can be configured to route requests out from IAM control plane 104 to a customer overlay 118 that includes IDCS 120. The external proxy 116 may be configured with an allow list of URLs for endpoints outside the service enclave 102 to which IAM control plane 104 can send requests. The service enclave 102 may be similar to the service tenancies described below in FIGS. 9-13. The customer overlay 118 may be an overlay network (e.g., a virtual cloud network) corresponding to a tenancy for a customer (e.g., customer 110).

The key-value database 114 may be configured to store data for IAM control plane 104, including data entities representing users, groups, dynamic groups, policies, and the like for tenants. As the entity names suggest, a user can be a data entity representing a user (e.g., a user account, user identifier, username, other user credential, etc.), a group can be a data entity for a collection of related users, including group policies associating attributes or roles for the users, and so on. As discussed briefly above, prior to integration into the IIMS, the separate IAM service could store data entities corresponding to users, groups, policies, etc., in the key-value database 114. After integration with IDCS 120, most tenants' identity data entities may be moved into type-one domains associated with the IDCS 120. Some tenants may still use the IAM service to manage the identity entities. In the IIMS, these tenants can have their users, groups, and the like moved into a type-two domain.

The IAM data plane 106 may be configured to store data related to the domains, including URLs for the domains and domain resources. The IAM data plane 106 may also cache (via replication) data from key-value database 114. The domain data in IAM data plane 106 can include metadata for the IDCS 120 stripes. The IAM data plane 106 can also store a list of authorized service principals for which requests that are transformed and sent from IAM control plane 104 to IDCS 120 are authorized on behalf of a user. IAM data plane 106 can use the list to generate (and store) an on-behalf-of (OBO) token that can be included in a request transformed by IAM control plane 104. As used herein, a service principal can represent a resource within the distributed computing system 100 that can generate requests or calls to services within the distributed computing system 100. For example, a service principal could be an instance of compute control plane, the control plane managing tasks for one or more compute instances. In some cases, a service principal can make calls to services on behalf of a user. In some other cases, a service principal can make calls to services not on behalf of any user.

As an example of the operation of the IIMS, customer 110 can send a request to IAM control plane 104 to perform an entity operation. The request may be received at the service enclave 102 by load balancer 112, which can route the request appropriately to IAM control plane 104. The entity operation can include, for example, creating a new user, modifying an existing user, deleting a user, creating or modifying a group, creating or modifying a role, creating or modifying a policy, deleting a group, etc. The request can be configured for an interface to IAM control plane 104 (e.g., an API for calling IAM control plane 104). IAM control plane 104 can use the request to determine to which domain the entity operation corresponds. If the domain is one in which the entities are managed by IAM control plane 104 (e.g., a type-two domain), then the request may be processed as it would have been prior to the integration, with IAM control plane 104 performing the requested entity operation at key-value database 114 and providing the corresponding response to customer 110. If the domain is one in which the entities are managed by IDCS 120 (e.g., a type-one domain), then the IAM control plane 104 can transform the request corresponding to an interface used by IDCS 120. The IAM control plane 104 may include a compatibility layer that can be configured to transform the requests. The customer 110 may also send requests to IDCS 120 directly to perform entity operations. The IAM control plane 104 can also transform responses from the interface used by IDCS 120 to the interface used by IAM control plane 104.

In conjunction with transforming the call payload to correspond to an interface of IDCS 120, the IAM control plane 104 can obtain an OBO token for authorization from IAM data plane 106 and include it with the transformed request. If an OBO token is included in a request to IDCS 120, IDCS 120 may subsequently call IAM data plane 106 to verify the token for authorization. Functionally, IDCS 120 authorizes the request as coming from the user (e.g., customer 110) to which the OBO token corresponds and not from IAM control plane 104 which sent the transformed request, and so authorization is checked against policies for the user.

Additionally, the data entities may be sharded across multiple domains. This sharding can create potential consistency issues in cases where a service principal makes a request to IAM control plane 104 not on-behalf-of a user (e.g., compute control plane creates a new user). IAM data plane 106 may have a replication delay when updating domain metadata due to changes made to entities in the domain by IDCS 120. Thus, these updates may not be available for subsequent calls to IAM control plane 104. For example, if a service principal creates a user in a domain, data for the new user may not appear in IAM data plane 106 for several seconds. A subsequent request received by IAM control plane 104 that makes use of the new user (e.g., add the new user to a group) may not be successful. IAM control plane 104 can incorporate retry with exponential backoff to have the requester (e.g., a client machine of customer 110) delay retries of requests so that IAM data plane 106 can catchup. Retry with exponential backoff can include having the requesting client send the original request subsequent times, with each subsequent request delayed by exponentially longer time from the attempt immediately prior.

Figure 2:
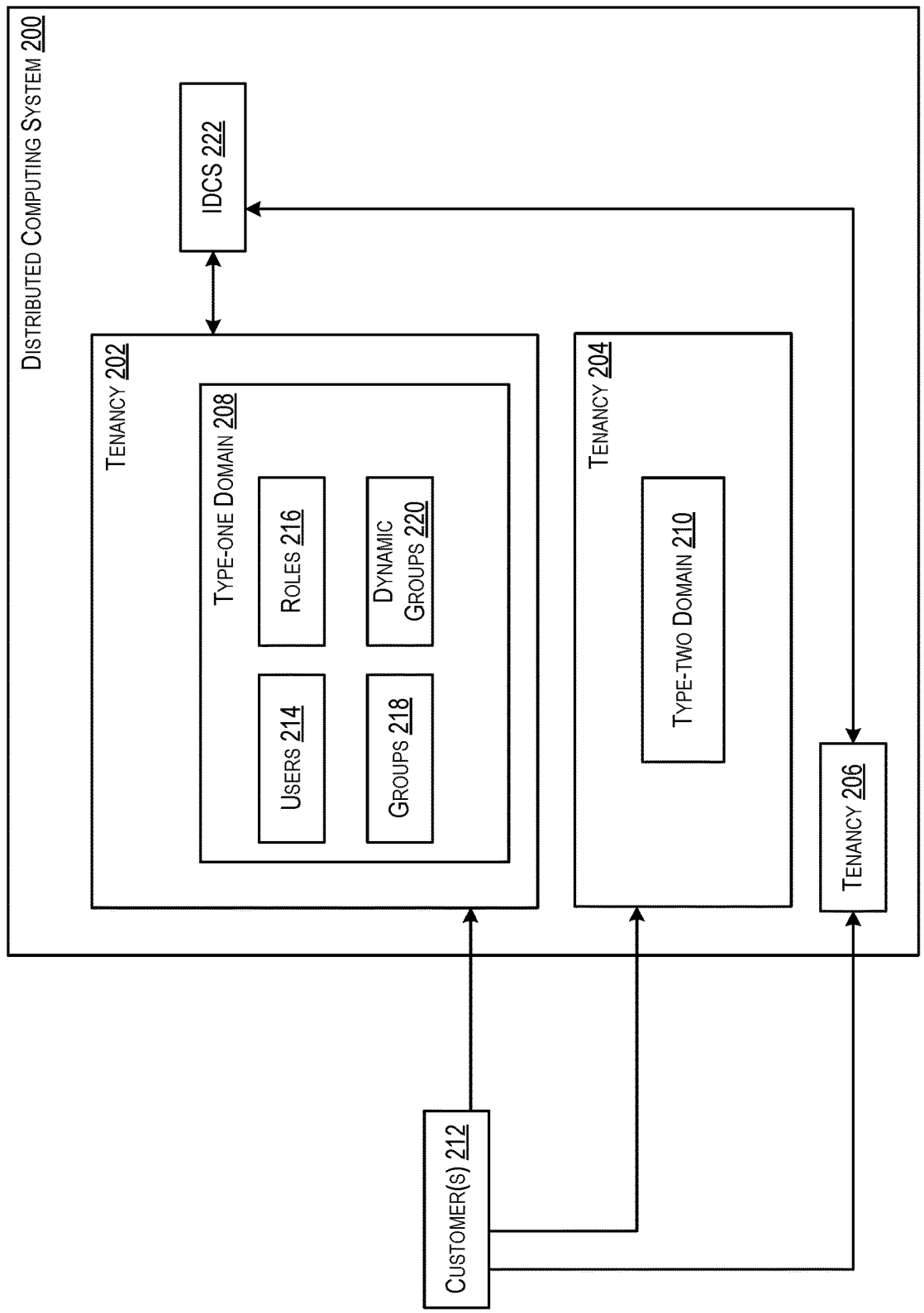
FIG. 2 depicts a distributed computing system with a domain for entities of an identity and access management service, according to at least one embodiment.

FIG. 2 depicts a distributed computing system 200 with a type-one domain 208 and type-two domain 210 for entities of an integrated identity management service, according to at least one embodiment. The distributed computing system 200 may be an example of the distributed computing system 100 of FIG. 1. The distributed computing system 200 may provide computing resources for one or more tenancies, including tenancy 202, tenancy 204, and tenancy 206. As described in more detail below with respect to FIGS. 9-13, each tenancy may correspond to a customer (e.g., customer(s) 212) and represent a logical division of computing resources within the distributed computing system 200 for each customer that are secure and partitioned from other tenancies. Tenancies may be associated with one domain or more than one domain (including both type-one and type-two domains).

Tenancy 202 may be associated with type-one domain 208. Type-one domain 208 can include one or more identity data entities. As depicted, type-one domain 208 can include users 214, roles 216, groups 218, and dynamic groups 220. Users 214 can represent corresponding users of the distributed computing system 200 (e.g., individual users of a CSP customer). For example, a user of users 214 may be an administrator for the tenancy 202. The administrator may be able to create additional domains in tenancy 202, create, update, delete, or otherwise modify users 214, roles 216, groups 218, dynamic groups 220, or other entities in type-one domain 208 or other domains in the tenancy 202. Groups 218 can be a static collection of one or more of users 214. Roles 216 can represent permissions associated with the data entities in the type-one domain 208, including application instance entities. Dynamic groups 220 can be similar to groups 218, but group a set of resources in the tenancy 202 based on a rule. The resources in the dynamic group may not be limited to users 214 and can include service principals within the tenancy 202. Type-one domain 208 can also include policies (e.g., group policies) and credentials (e.g., user credentials).

Tenancy 204 may be associated with type-two domain 210. Similar to type-one domain 208, type-two domain 210 can include users, groups, dynamic groups, etc. The type-two domain 210 may be an entity of the IAM service of the distributed computing system 200 but where entity management within the tenancy 204 is managed by the IAM service rather than IDCS (e.g., IDCS 222). For example, a customer of customer(s) 212 may be associated with tenancy 204 and send a request to the distributed computing system 200 to perform an entity operation. The IAM service can determine that the entity operation is associated with tenancy 204 and the type-two domain 210. For example, the customer may be associated with a user account in the type-two domain 210 and the entity operation may be to create a new user in the tenancy 204. Based on the determination that the entity operation is associated with the type-two domain 210, the IAM service can perform the entity operation.

By contrast, a customer (e.g., customer(s) 212) may be associated with tenancy 202 and send a request to distributed computing system 200 to perform an entity operation at tenancy 202. For example, the customer may use a script that was configured to make API calls to the IAM service for managing identity entities prior to an integration of the IAM service with the IDCS 222. However, the identity entities in the domains associated with tenancy 202 may be managed by IDCS 222. The IAM service can determine that the entity operation is associated with tenancy 202 and type-one domain 208. For example, the customer may be associated with a user account in the type-one domain 208 and the entity operation may be to create a new user in the tenancy 202. Based on the determination that the entity operation is associated with the type-one domain 208, the IAM service can transform the request to an API for IDCS 222 and send the transformed request to IDCS 222. IDCS 222 may then perform the requested entity operation. Similar interactions may result for requests from customer(s) 212 and tenancy 206. The IAM service can also transform responses from the IDCS 222 that are configured according to the API of IDCS 222 to an API of the IAM service.

Figure 3:
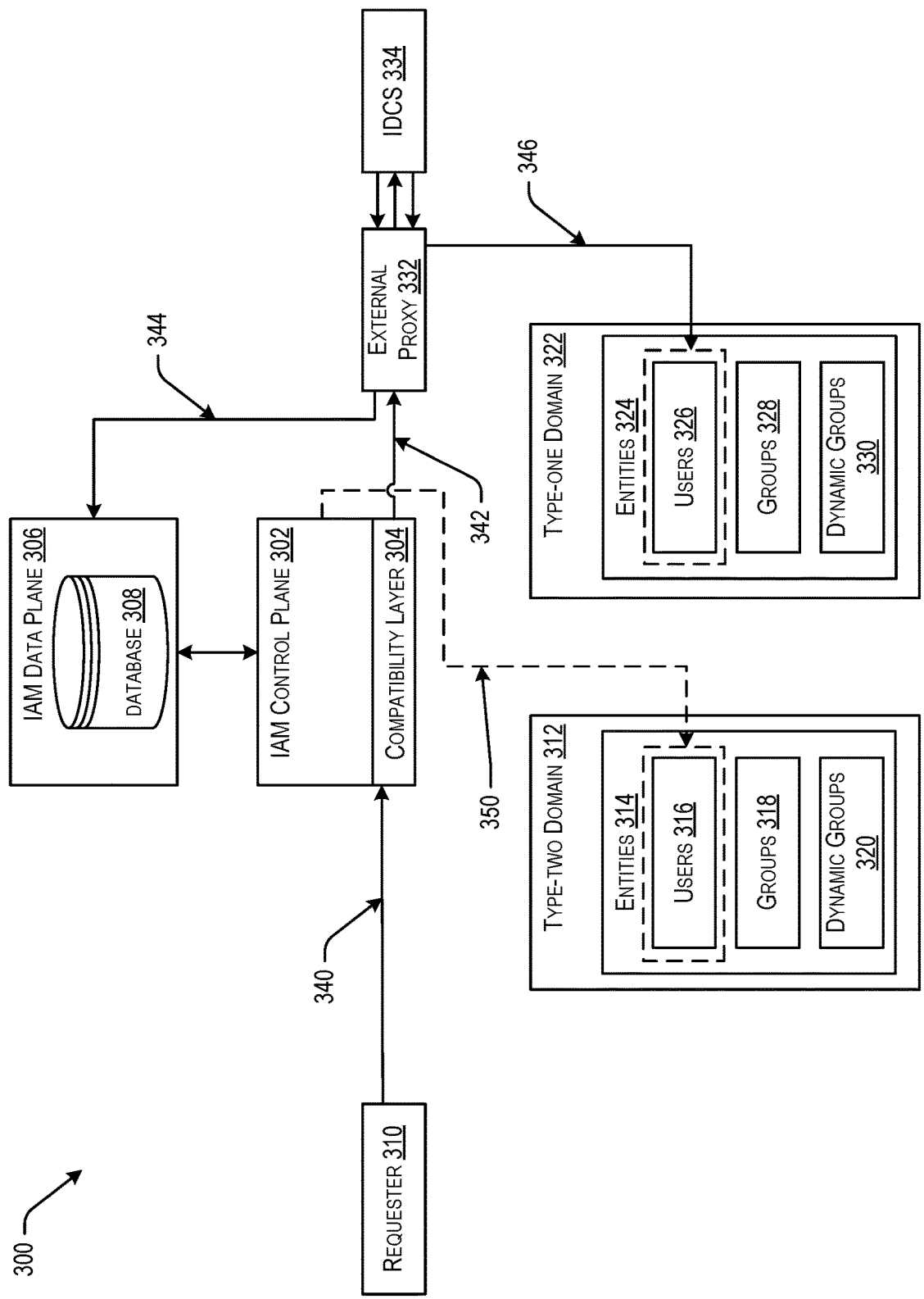
FIG. 3 depicts an identity and access management service with a compatibility layer configured to transform requests for an identity cloud service, according to at least one embodiment.

FIG. 3 depicts a computing environment 300 (e.g., distributed computing system 200 of FIG. 2) with an identity and access management service having an IAM control plane 302 with a compatibility layer 304 configured to transform requests for an identity cloud service (IDCS) 334, according to at least one embodiment. Both the IAM service and the IDCS 334 may be implemented by a CSP, and both may form a part of an IIMS with a first identity service (e.g., the IAM service) and a second identity service (e.g., the IDCS).

A request 340 may be sent to the IAM control plane 302 from a requester 310. The requester 310 may be a customer (e.g., customer(s) 212 of FIG. 2) of the CSP. In some embodiments, the requester 310 is an instance of a service (e.g., service principal) or other application or process executing within of the computing environment 300. For example, the requester 310 could be an application instance in a customer's tenancy that has permissions (e.g., via a policy or role in a domain of the tenancy) to perform operations within the domain. The request 340 may be configured according to an API of the IAM control plane 302. For example, the request 340 may be an HTTP request, a REST request, a remote procedure call, or other similar request. The request 340 may include information characterizing an entity operation to be performed by the IIMS. As one example, the request 340 may be a request to create a new user in the IIMS.

After receiving the request, the IAM control plane 302 can determine whether the request is associated with a type-one domain 322 or a type-two domain 312. Determining whether the request is associated with a domain can include determining whether the requester 310 is associated with the type-one domain 322 or type-two domain 312. For example, the requester 310 may be a user with a user account and credentials in the type-one domain 322. As another example, the request 340 may correspond to an entity operation for an entity in the type-one domain 322.

If the IAM control plane 302 determines that the request 340 is associated with the type-one domain 322, the IAM control plane 302 can transform the request to an API for the IDCS 334 to produce a transformed request 342. The API for the IDCS 334 may be, in one embodiment, a System for Cross-domain Identity Management (SCIM) API, one type of a REST API. Transforming the request can include converting the operations defined in the request 340 to operations of the new interface (e.g., SCIM operations). The transformed request 342 can be sent to IDCS 334 via the external proxy 332. The external proxy 332 can include an allow list or other list of authorized URLs to which the IAM control plane 302 is allowed to communicate from within the service enclave. The IAM control plane 302 can identify the appropriate URL for the IDCS 334 instance corresponding to the type-one domain 322.

In some embodiments, the IAM control plane 302 can include an OBO token with the transformed request 342. The OBO token can be generated by IAM data plane 306, and a copy stored at database 308. The OBO token can be an identifier associated with a user, service instance, or other actor within the computing environment 300. For example, the OBO token can be an identifier associated with the requester 310. As another example, the requester 310 may be an application within the computing environment 300 making the request 340 on-behalf-of another a user. The OBO token can then be associated with the user. The OBO token in the transformed request 342 can be used for authorization of the transformed request 342 by the IDCS 334. The IDCS 334 can send a verification request 344 to IAM data plane 306. IAM data plane 306 can then verify that the OBO token correctly corresponds to the associated actor (e.g., requester 310). The transformed request 342 is thereby authorized for the originating actor, allowing IDCS 334 to apply policies or permissions for that actor when acting on the transformed request 342. For example, requester 310 may be authorized to perform only specific entity operations in the request 340. The OBO token can allow IDCS 334 to verify and apply the correct permissions for requester 310 (rather than for IAM control plane 302 that sends the transformed request 342) and not perform an entity operation for an unauthorized requester.

Once IDCS 334 has verified the authorization of the transformed request 342, IDCS 334 can perform the entity operation 346 to, for example, create a user of users 326 in the type-one domain 322. The entity operation 346 could also include modifying 328, dynamic groups 330, roles, policies, applications, credentials, or other entities 324 in type-one domain 322.

If the IAM control plane 302 determines that the request 340 is associated with a type-two domain 312, the request 340 is not transformed and is handled by IAM control plane 302. The IAM control plane 302 can perform the entity operation 350 to, for example, create a user of users 316 in the type-two domain 312 or create, modify, and/or delete other entities 314 in type-two domain 312.

Figure 4:
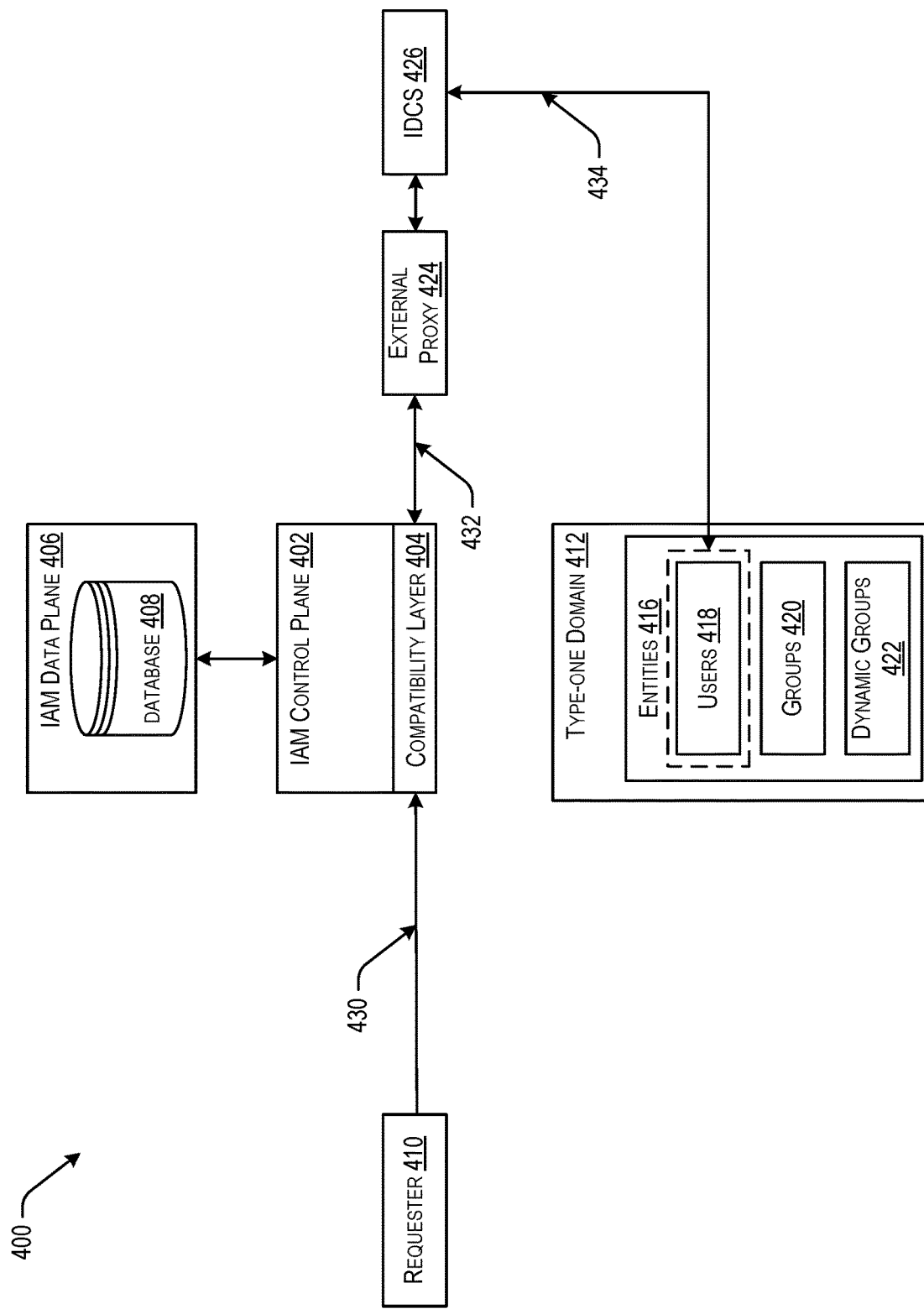
FIG. 4 depicts an identity and access management service with a compatibility layer configured to implement idempotency tokens for requests sent to an identity cloud service, according to at least one embodiment.

FIG. 4 depicts a computing environment 400 with an identity and access management service having an IAM control plane 402 with a compatibility layer 404 configured to transform requests for an identity cloud service (IDCS) 426. Computing environment 400 may be an example of computing environment 300 of FIG. 3 according to a specific embodiment.

As discussed previously, maintaining backwards compatibility within the IIMS can include techniques for handling idempotency of certain entity operations. For example, the requests for the API of the IAM service may use idempotency tokens to identify API calls having operations that are idempotent. An idempotent operation is one for which successive identical operations do not result in a change to the corresponding operation target. For example, creating a new user in the IAM service may be idempotent, such that a second request to create the same user will not result in the creation of a duplicate user. Instead, the IAM service will return the result corresponding to the completion of the operation (e.g., returning a response with user creation information) but without making a change.

A requester 410 can send a request 430 to the IAM control plane 402. Similar to the process described above with respect to FIG. 3, the IAM control plane 402 can determine that the request 430 is associated with a type-one domain 412 of the computing environment 400 and transform the request using compatibility layer 404. The transformed request 432 can then be sent to the IDCS 426 via the external proxy 424. Requester 410 sending the request 430 to IAM control plane 402 (but handled by IDCS 426 in the IIMS) will typically expect idempotency of the operations defined by the API for the IAM service. For example, the requester 410 may use scripts to generate the request 430 that rely on idempotency of operations with the IAM service. The request 430 can therefore include an idempotency token that can uniquely identify the entity or entity operation corresponding to the request.

If the request 430 has an idempotency token, IAM control plane 402 can check whether the token has been stored. The check may be by IAM data plane 406 for a token stored at database 408. The idempotency token may also be stored at a key-value database (e.g., key-value database 114 of FIG. 1) accessible to IAM control plane 402. If no idempotency token is stored, then IAM control plane 402 can send an idempotency verification request 432 to IDCS 426 (via external proxy 424). The idempotency verification request 432 can be a request to verify whether the requested entity operation has already been performed previously by IDCS 426. For example, the request 430 may be a request to create a new user of users 418. IDCS 426 can check whether the user exists and provide a corresponding indication to IAM control plane 402. If the entity operation has not been performed, the IAM control plane 402 can, in response to the indication that the entity operation has not been performed, transform the request 430 as described herein and send the transformed request to IDCS 426. The IAM control plane 402 can store the idempotency token for future idempotency checks.

The IAM control plane 402 may receive a subsequent request with an idempotency token. The IAM control plane 402 can determine whether the stored idempotency token matches the received idempotency token. If so, the entity operation of the subsequent request has been previously performed. The IAM control plane 402 can then respond to the request with an indication corresponding to the completion of the entity operation but without performing the entity operation a second time (e.g., by transforming the request and sending the transformed request to IDCS 426).

Figure 5:
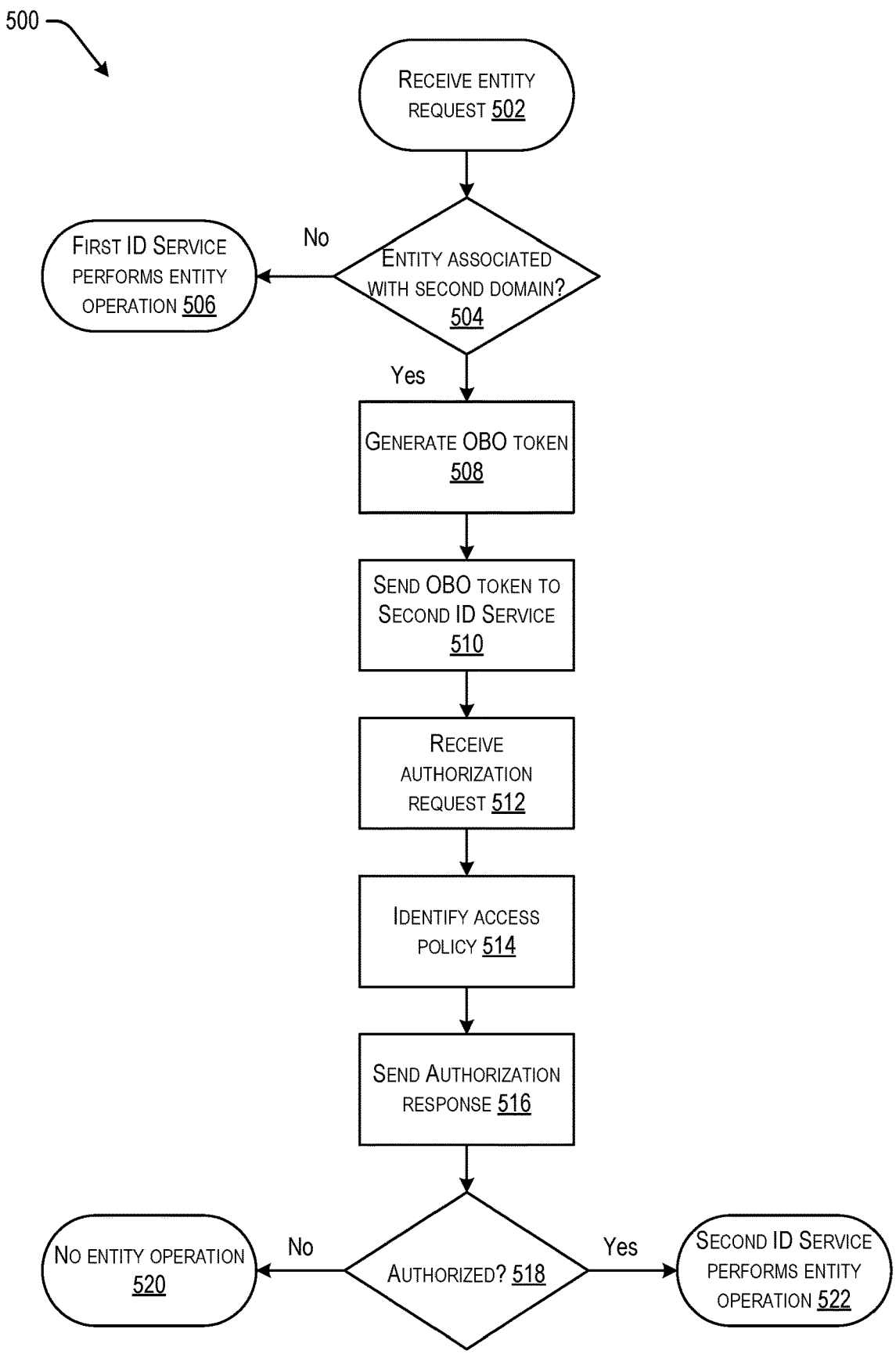
FIG. 5 is a flow diagram of an example process for a first identity service to send an entity operation request to a second identity service to perform the requested operation on-behalf-of an original requestor, according to at least one embodiment.

FIG. 5 is a flow diagram of an example process 500 for a first identity service (e.g., an IAM service) to send an entity operation request to a second identity service (e.g., an IDCS) to perform the requested operation on-behalf-of an original requestor, according to at least one embodiment. The operations of process 500 may be performed by one or more components of a distributed computing system as described herein, including the IAM control plane 104 and IDCS 120 of FIG. 1. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 500 can begin at start point 502 with the first identity service receiving a request for an entity operation. The request may be received from a requester, which may be a customer of the distributed computing system and associated with a user account of a tenancy of the distributed computing system. The request may be received by a control plane of the first identity service (e.g., IAM control plane 104 of FIG. 1).

At decision 504, the first identity service can determine whether the entity corresponding to the entity operation is associated with a second domain. As used in this description with respect to FIG. 5, the second domain may be similar to a type-one domain and may include data entities that are managed by the second identity service (e.g., IDCS). In comparison, a first domain may be similar to a type-two domain that includes data entities that are managed by the first identity service. Determining whether the entity is associated with the second domain can include determining that the entity operation is to be performed on entities in the second domain. In some examples, determining whether the entity is associated with the second domain can include determining that the requester is associated with the second domain (e.g., the requester has a user account in the second domain). If the first identity service determines that the entity is not associated with the second domain, the entity operation may be performed by the first identity service. In some embodiments, the first identity service may further positively determine that the entity is associated with the first domain.

If the first identity service determines that the entity is associated with the second domain, the first identity service can generate an OBO token, at block 508. The OBO token can be generated by an IAM data plane (e.g., IAM data plane 106 of FIG. 1). The OBO token can identify the requester sending the request. The OBO token can be included with a transformed request sent from the first identity service to the second identity service, at block 510.

At block 512, the first identity service can receive an authorization request from the second identity service. The authorization request can include the OBO token. The authorization request may be received by the IAM data plane of the first identity service. At block 514, the first identity service can identify and access policy that corresponds to the OBO token. For example, the OBO token may identify an administrator of the tenancy of the distributed computing system. Based on the OBO, a policy characterizing the permissions of the administrator may be identified. The policy may be used to determine that the actor corresponding to the OBO token is authorized to perform the entity operation at the second identity service. Based on the access policy, the first identity service can send an authorization response to the second identity service, at block 516.

At decision 518, if the requester corresponding to the OBO token is authorized, the second identity service can perform the entity operation corresponding to the request, at endpoint 522. If the requester corresponding to the OBO token is not authorized, no entity operation may be performed, at endpoint 520.

Figure 6:
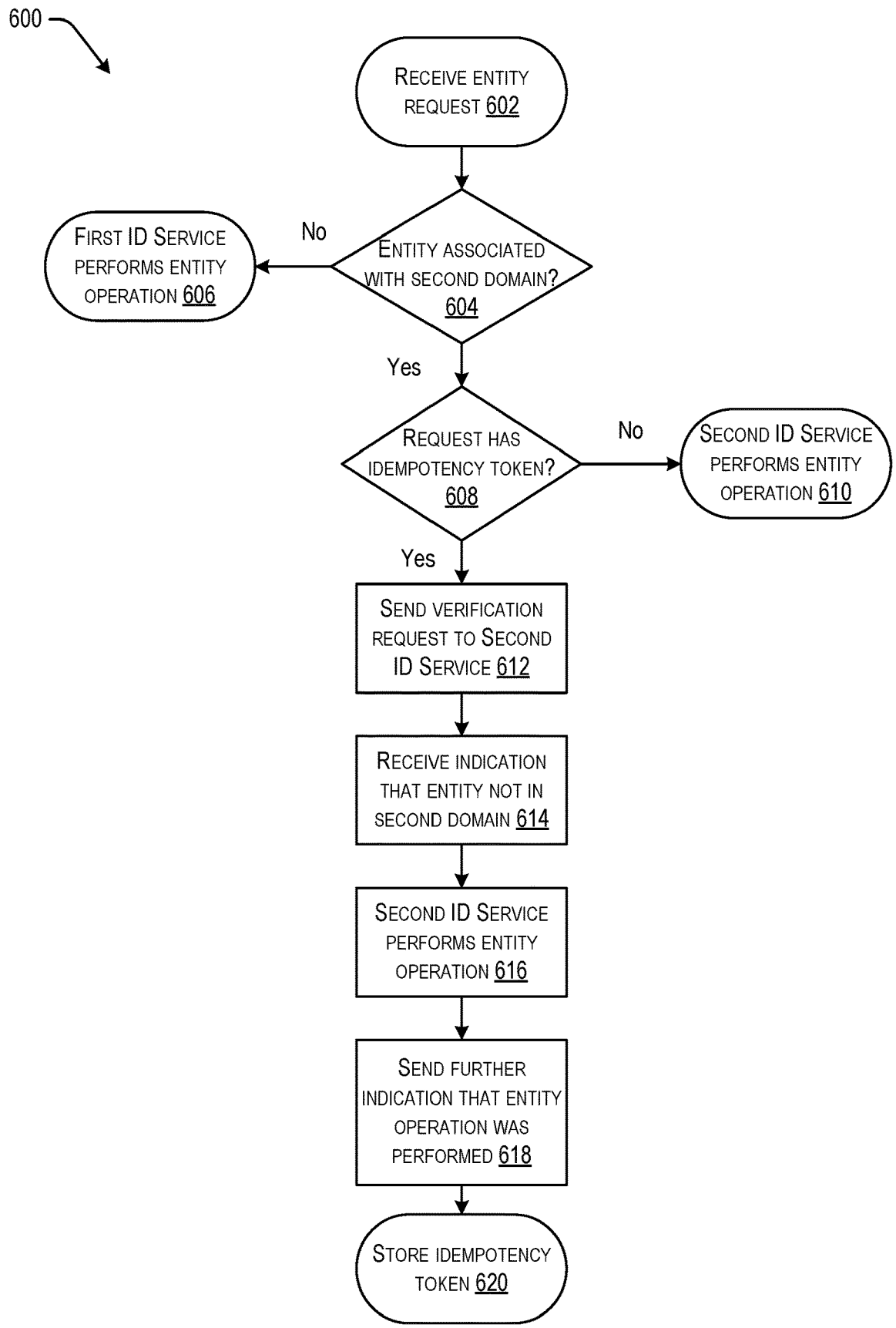
FIG. 6 is another flow diagram of an example process for a first identity service to call a second identity service to verify the existence of an entity in response to an entity operation including an idempotency token, according to at least one embodiment.

FIG. 6 is another flow diagram of an example process for a first identity service (e.g., an IAM service) to call a second identity service (e.g., an IDCS) to verify the existence of an entity in response to an entity operation including an idempotency token, according to at least one embodiment. As with process 500, the operations of process 600 may be performed by one or more components of a distributed computing system as described herein, including the IAM control plane 104 and IDCS 120 of FIG. 1.

Process 600 can begin at start point 602 with the first identity service receiving a request for an entity operation. The request may be received from a requester, which may be a customer of the distributed computing system and associated with a user account of a tenancy of the distributed computing system. The request may be received by a control plane of the first identity service (e.g., IAM control plane 104 of FIG. 1).

At decision 604, the first identity service can determine whether the entity corresponding to the entity operation is associated with a second domain (e.g., a type-one domain). The operations of decision 604 may be similar to the operations described above with respect to decision 504 of FIG. 5. If the first identity service determines that the entity is not associated with the second domain, the first identity service may perform the entity operations, at endpoint 606.

If the first identity service determines that the entity is associated with the second domain, the first identity service can then determine if the request includes an idempotency token, at decision 608. If the request does not have an idempotency token, then the first identity service can handle the request as otherwise described herein, including transforming the request and sending the transformed request to the second identity service to perform the entity operation, at endpoint 610. If the request does have an idempotency token, the first identity service can send an idempotency verification request to the second identity service, at block 612.

At block 614, the first identity service may receive an indication that the entity corresponding to the entity operation does not exist in the second domain. In response to the indication, the first identity service may proceed by transforming the request and sending the transformed request to the second identity service to perform the entity operation, at block 616. The first identity service can provide an indication to the requester that the entity operation was performed, at block 618. The first identity service can then store the idempotency token, at endpoint 620.

Figure 7:
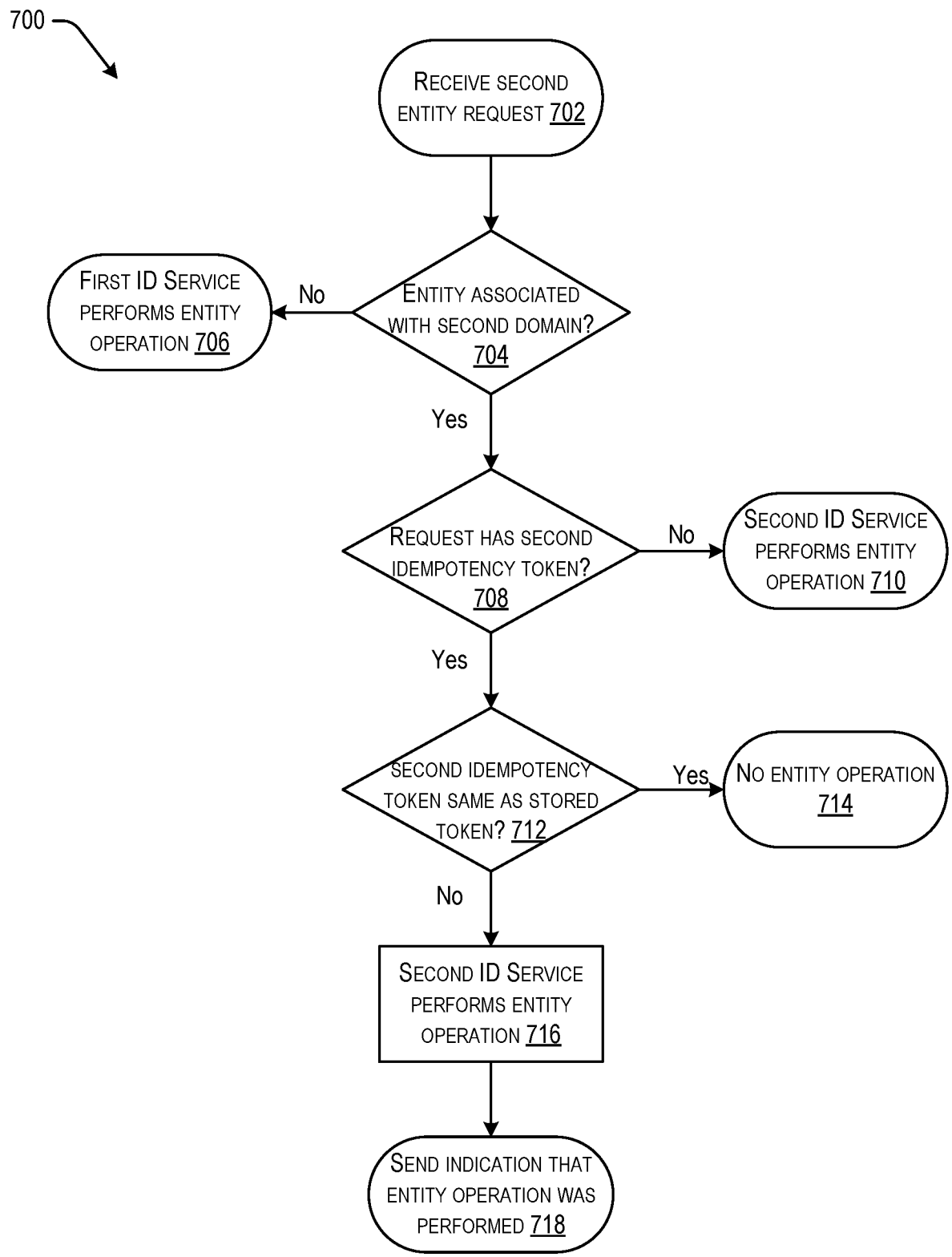
FIG. 7 is another flow diagram of an example process for a first identity service to verify the existence of a stored idempotency token matching an idempotency token of a request for an entity operation, according to at least one embodiment.

FIG. 7 is another flow diagram of an example process 700 for a first identity service (e.g., an IAM service) to verify the existence of a stored idempotency token matching an idempotency token of a request for an entity operation, according to at least one embodiment. The operations of process 700 may occur after one or more of the operations described above with respect to FIG. 6. As with process 500 and process 600, the operations of process 700 may be performed by one or more components of a distributed computing system (e.g., distributed computing system 100 of FIG. 1), including IAM control plane 104 and IDCS 120 of FIG. 1.

Process 700 may begin at start point 702 with the first identity service receiving a second entity request. The second entity request may be received from a requester (e.g., a second requester) and may be received after the IIMS has performed an entity operation for a first request sent from the requester. For example, the first request may have corresponded to an entity operation to create a user in a second domain. The second request may also correspond to an entity operation to create the same user in the second domain. In some embodiments, a requester (e.g., a client device of a customer) may retry requests based on responses from the distributed computing system if, for example, an IAM control plane of an IAM service is imposing a delay to allow an IAM data plane replication to occur following previous entity operations. The first identity service can determine whether the entity is associated with the second domain (e.g., a type-one domain). The operation of decision 704 and endpoint 706 may be similar to operations of decision 604 and endpoint 606 described above with respect to FIG. 6.

At decision 708, the first identity service can determine whether the second request contains an idempotency token (e.g., a second idempotency token). If the second request does not have an idempotency token, then the first identity service may transform the request and send the transformed request to the second identity service to perform the entity operation, at endpoint 710.

If the second request has an idempotency token, the first identity service can compare the second idempotency token and the stored idempotency token to determine whether the second idempotency token is the same as the stored token, indicating that the entity operation was previously performed (e.g., as in process 600 of FIG. 6). If the second idempotency token is the same, then the first identity service may not perform the entity operation, at endpoint 714. If the second idempotency token is not the same as the stored idempotency token, then the first identity service may transform the request and send the transformed request to the second identity service to perform the corresponding entity operation, at block 716.

At endpoint 718, the first identity service may provide to the requester an indication that the corresponding entity operation was performed (e.g., performed successfully by the second identity service).

Figure 8:
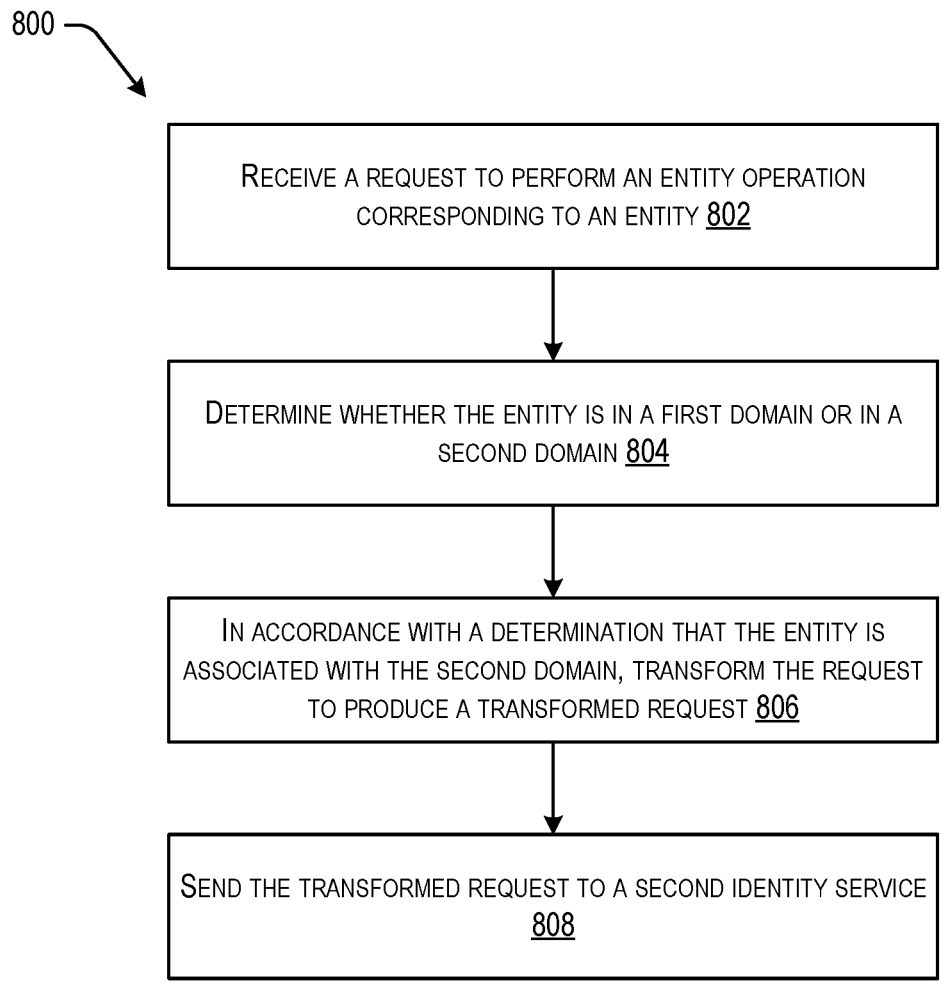
FIG. 8 is a flow diagram of an example process for a first identity service to receive a request for an entity operation and determine if the operation is to be performed by a second identity service, according to at least one embodiment.

FIG. 8 is a flow diagram of an example process 800 for a first identity service (e.g., an IAM service) to receive a request for an entity operation and determine if the operation is to be performed by a second identity service (e.g., an IDCS), according to at least one embodiment. the operations of process 800 may be performed by one or more components of a distributed computing system (e.g., distributed computing system 100 of FIG. 1), including IAM control plane 104 and IDCS 120 of FIG. 1.

The process 800 may begin at block 802 with the first identity service receiving a request to perform an entity operation. The request may be received at a computing device (e.g., a first identity service device) hosting at least part of the first identity service. The entity operation may correspond to an entity of an IIMS. The entity may be, for example, a user, a group, a dynamic group, a role, a policy, an application, a credential, or similar entities. In some embodiments, the entity can correspond to a new user account and the entity operation can correspond to creating the new user account. The request may be received from a requester, which can be a customer of a CSP providing the distributed computing system. In some embodiments, the requester may be another service within the distributed computing system. In some embodiments, the request may include a request payload configured according to a first interface standard for the first identity service. For example, the request payload may be configured according to a REST API of the first identity service. The REST API may define operations, including entity operations, for creating, updating, and deleting data entities by the first identity service.

At block 804, the first identity service can determine whether the entity is associated with a first domain (e.g., a type-two domain) associated with the first identity service or a second domain (e.g., type-one domain) associated with a second identity service. In some embodiments, the domains may represent data within the first identity service and containing one or more data entities representing identity data, including users, groups, policies, etc. A second domain associated a second identity service may be metadata for data entities managed (e.g., created, updated, deleted, etc.) by the second identity service but having a representation in the second domain accessible to the first identity service. A first domain associated with the first identity service may include data entities managed by the first identity service. In some embodiments, the first domain can include first entity information for a first set of entities associated with a user account. Similarly, the second domain can include second entity information for a second set of entities associated with an additional user account.

Determining that the entity is associated with a first domain or with a second domain can include determining that the requester is in a tenancy of the distributed computing system that corresponds to the first domain or the second domain. For example, the requester may be a customer with a user account in a first domain of a tenancy, such that the request includes an entity operation for other entities in the first domain.

At block 806, if the entity is associated with the first domain, the first identity service can transform the request to produce a transformed request. Transforming the request can include converting the request payload to be configured according to a second interface standard for the second identity service device. For example, the second interface standard may be SCIM, so that the entity operation defined in the request payload can be converted to an operation defined in the SCIM API.

At block 808, the first identity service can send the transformed request to the second entity service. The transformed request may be sent to a computing device (e.g., second identity service device) hosting at least part of the second identity service. The transformed request may be sent using an external proxy device (e.g., external proxy 116 of FIG. 1). The external proxy device may be configured to route the transformed request based in part on the second domain corresponding to the second identity service. The entity information within the second domain can include a URL corresponding to the entity and identifying the second identity service location. The first identity service can use the URL to route the transformed request via the external proxy device.

In some embodiments, the first identity service may receive a second request to perform a second entity operation corresponding to the same entity. For example, the first request may have included the creation of a group, while the second request may include updating the group to include a user. Because of potential replication delay, the creation of the group by the second identity service may not be reflected in the second domain when the second request is received. The first identity service can provide an indication to the requester sending the second request to resend the second request after a time interval. The time interval can be determined based on a prior time interval between the first request and the second request. In some embodiments, the first identity service can provide subsequent indications to the requester to continue to retry the second request with increasing time intervals between each retry. The time interval between the subsequent retries may increase exponentially, so that subsequent requests are sent after increasingly longer delays, to minimize burdening the first identity service with excessive requests while waiting for the replication delay to resolve.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 9:
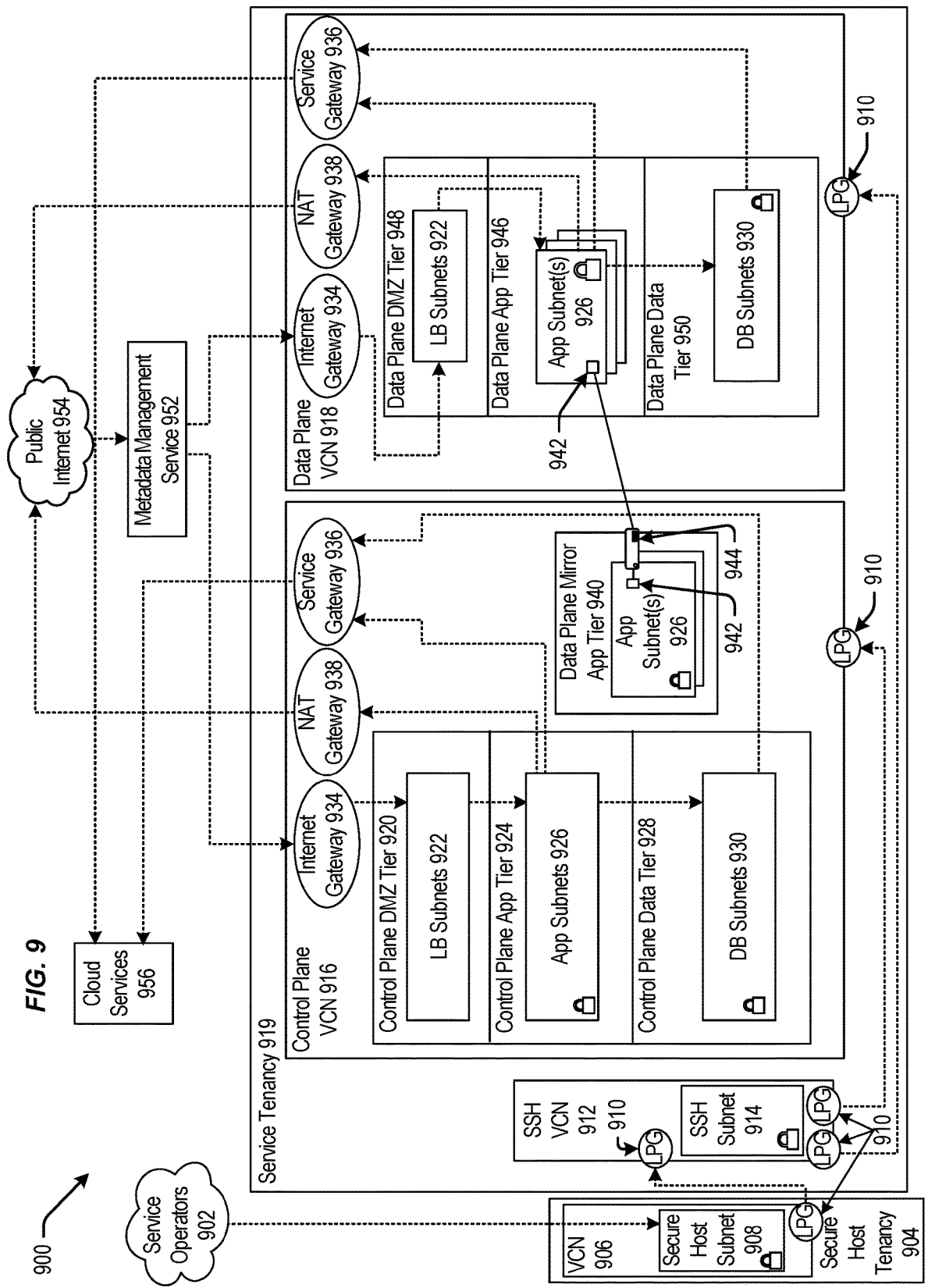
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
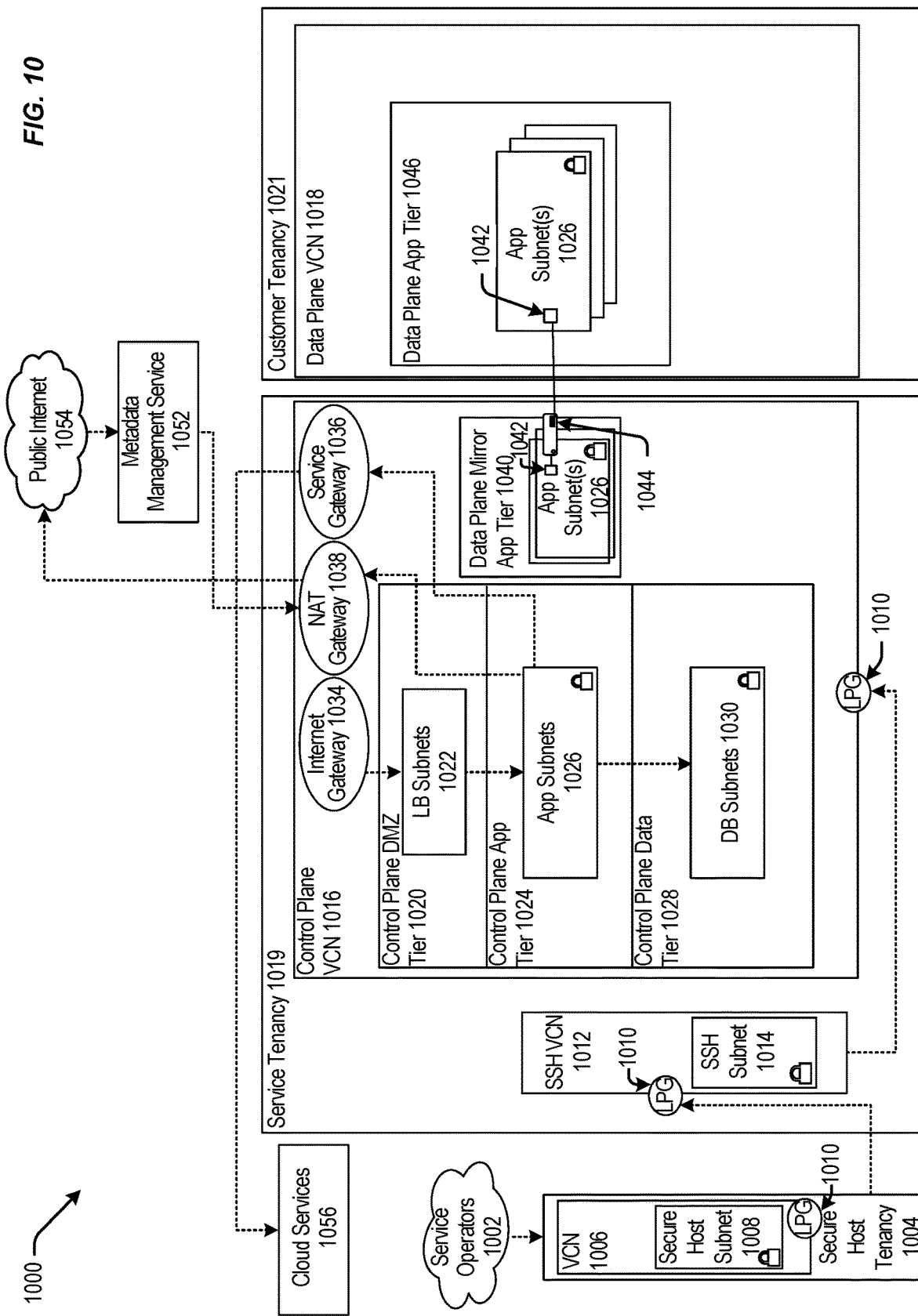
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 902 of FIG. 9) can be communicatively coupled to a secure host tenancy 1004 (e.g. the secure host tenancy 904 of FIG. 9) that can include a virtual cloud network (VCN) 1006 (e.g. the VCN 906 of FIG. 9) and a secure host subnet 1008 (e.g. the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g. the control plane DMZ tier 920 of FIG. 9) that can include LB subnet(s) 1022 (e.g. LB subnet(s) 922 of FIG. 9), a control plane app tier 1024 (e.g. the control plane app tier 924 of FIG. 9) that can include app subnet(s) 1026 (e.g. app subnet(s) 926 of FIG. 9), a control plane data tier 1028 (e.g. the control plane data tier 928 of FIG. 9) that can include database (DB) subnet(s) 1030 (e.g. similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g. the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g. the service gateway of FIG. 9) and a network address translation (NAT) gateway 1038 (e.g. the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g. the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, which are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
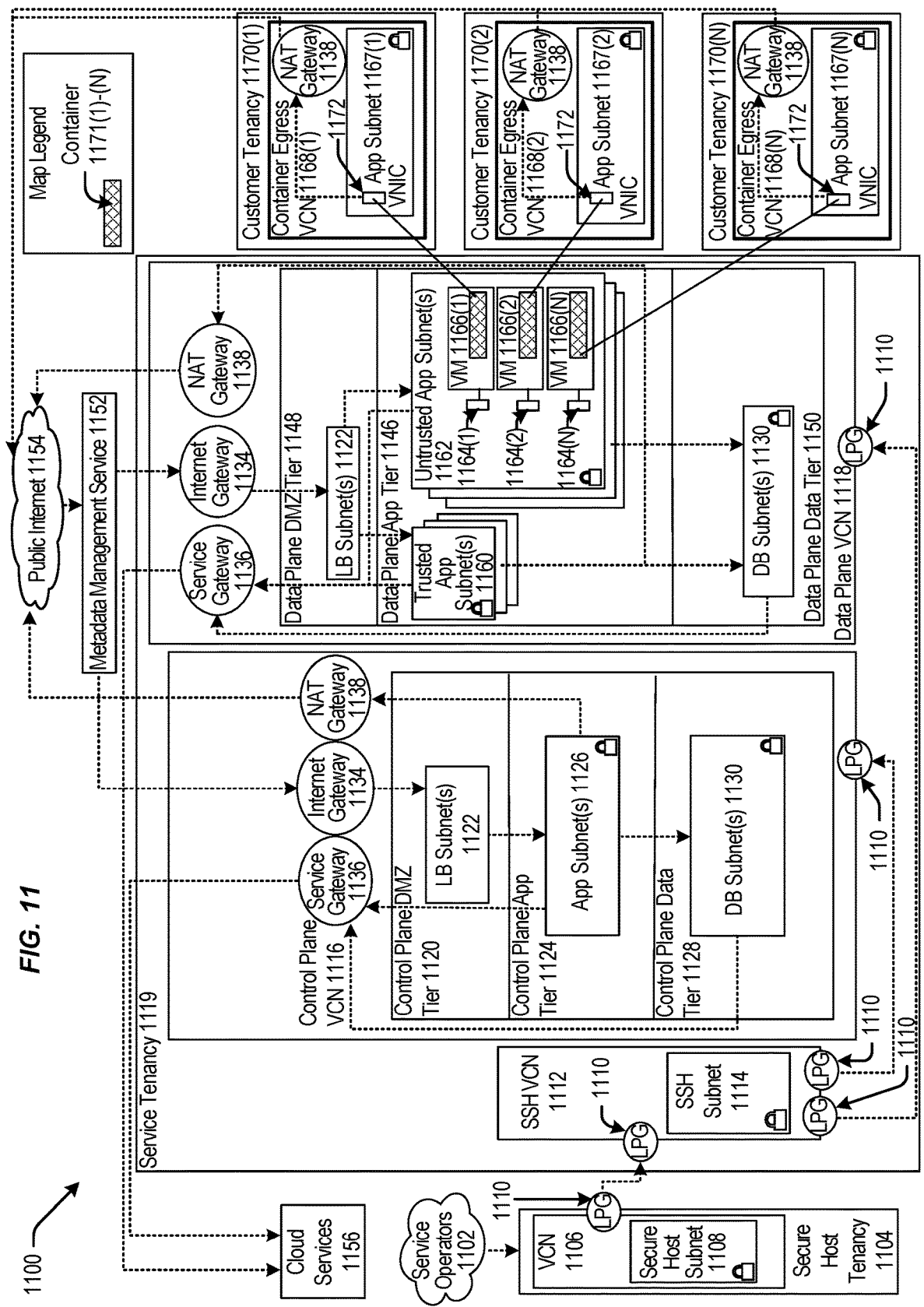
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 902 of FIG. 9) can be communicatively coupled to a secure host tenancy 1104 (e.g. the secure host tenancy 904 of FIG. 9) that can include a virtual cloud network (VCN) 1106 (e.g. the VCN 906 of FIG. 9) and a secure host subnet 1108 (e.g. the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g. the SSH subnet 914 of FIG. 9), and the SSH VCN 1112 can be communicatively coupled to a control plane VCN 1116 (e.g. the control plane VCN 916 of FIG. 9) via an LPG 1110 contained in the control plane VCN 1116 and to a data plane VCN 1118 (e.g.

the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g. the control plane DMZ tier 920 of FIG. 9) that can include load balancer (LB) subnet(s) 1122 (e.g. LB subnet(s) 922 of FIG. 9), a control plane app tier 1124 (e.g. the control plane app tier 924 of FIG. 9) that can include app subnet(s) 1126 (e.g. similar to app subnet(s) 926 of FIG. 9), a control plane data tier 1128 (e.g. the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 9) and a network address translation (NAT) gateway 1138 (e.g. the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g. the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
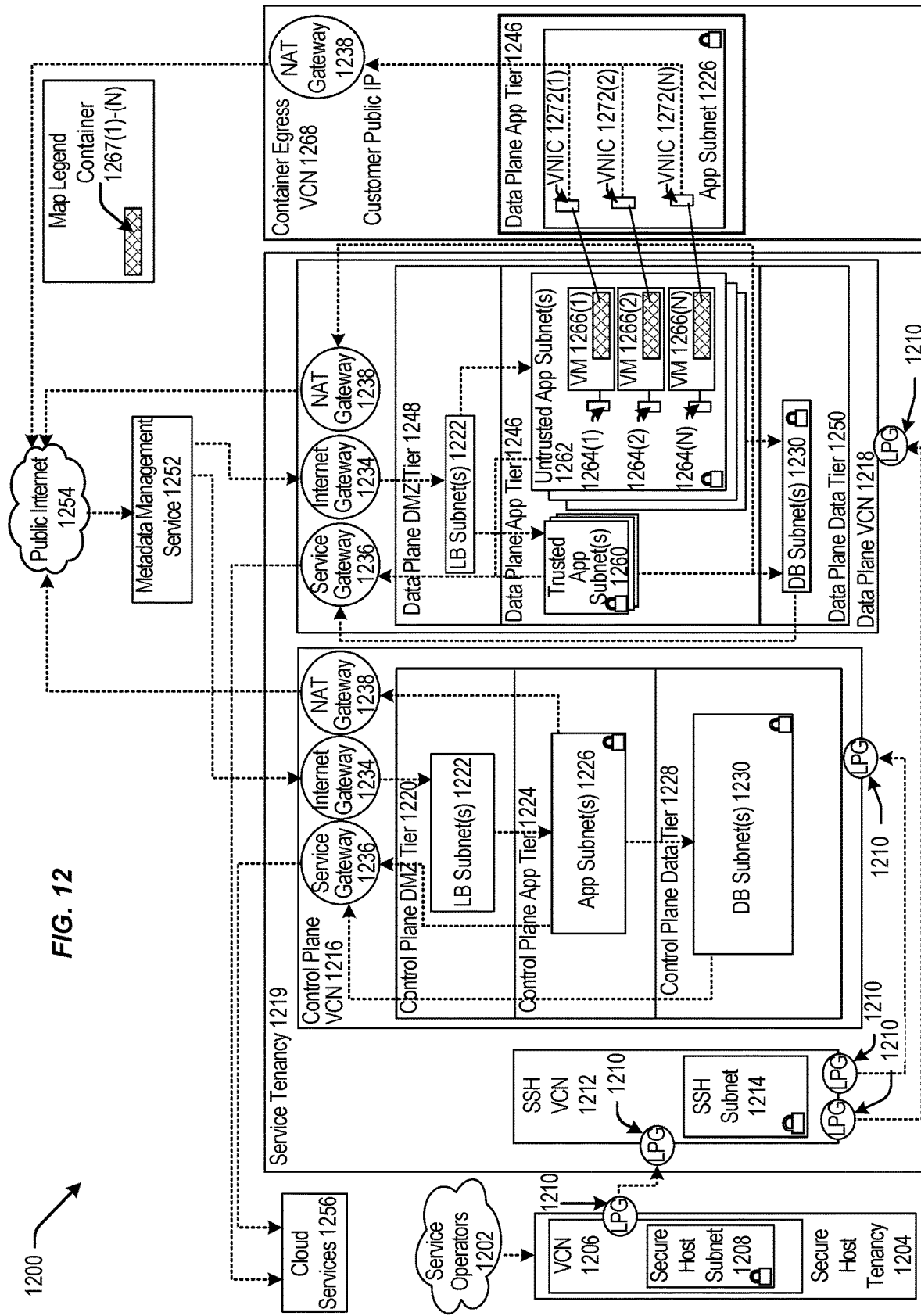
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 902 of FIG. 9) can be communicatively coupled to a secure host tenancy 1204 (e.g. the secure host tenancy 904 of FIG. 9) that can include a virtual cloud network (VCN)

1206 (e.g. the VCN 906 of FIG. 9) and a secure host subnet 1208 (e.g. the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g. the SSH subnet 914 of FIG. 9), and the SSH VCN 1212 can be communicatively coupled to a control plane VCN 1216 (e.g. the control plane VCN 916 of FIG. 9) via an LPG 1210 contained in the control plane VCN 1216 and to a data plane VCN 1218 (e.g. the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g. the control plane DMZ tier 920 of FIG. 9) that can include LB subnet(s) 1222 (e.g. LB subnet(s) 922 of FIG. 9), a control plane app tier 1224 (e.g. the control plane app tier 924 of FIG. 9) that can include app subnet(s) 1226 (e.g. app subnet(s) 926 of FIG. 9), a control plane data tier 1228 (e.g. the control plane data tier 928 of FIG. 9) that can include DB subnet(s) 1230 (e.g. DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 9) and a network address translation (NAT) gateway 1238 (e.g. the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g. the data plane data tier 950 of FIG. 9). The data plane DMZ tier 1248 can include LB subnet(s) 1222 that can be communicatively coupled to trusted app subnet(s) 1260 (e.g. trusted app subnet(s) 1160 of FIG. 11) and untrusted app subnet(s) 1262 (e.g. untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N) and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
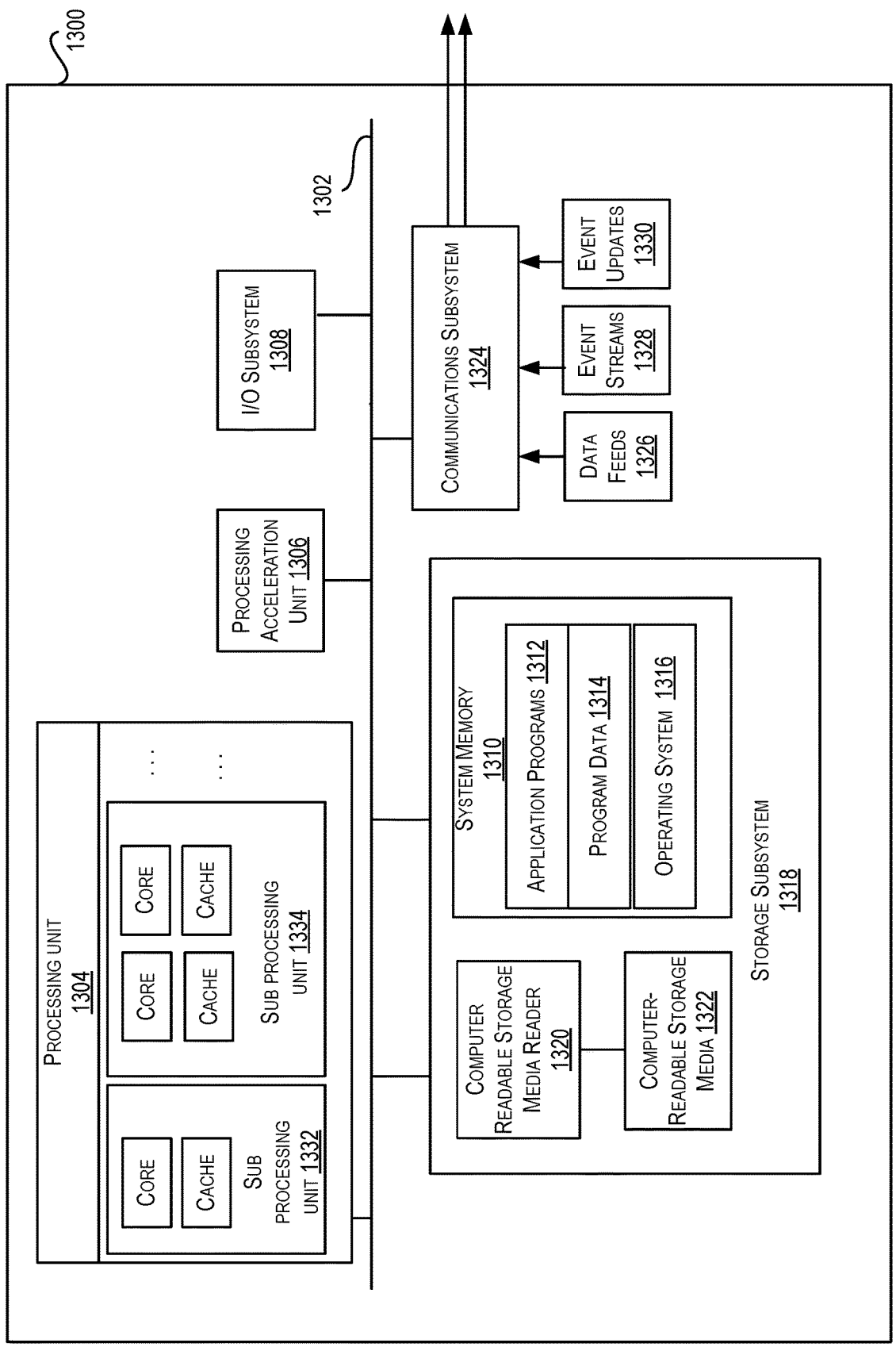
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, web cams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display sub system, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, programs, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a first identity service, a request to perform an entity operation corresponding to an entity;
   determining whether the entity is associated with a first domain corresponding to the first identity service or a second domain corresponding to a second identity service, the second domain associated with entities managed by the second identity service;
   in accordance with a determination that the entity is associated with the second domain corresponding to the second identity service, transforming the request to produce a transformed request;
   determining whether the request comprises an idempotency token uniquely identifying the entity or the entity operation;
   in accordance with a further determination that the request comprises the idempotency token, sending, to the second identity service, an idempotency verification request;
   receiving, from the second identity service in response to the idempotency verification request, an indication that the entity corresponding to the entity operation does not exist at a device associated with the second identity service; and
   transmitting, via an external proxy, the transformed request to the second identity service, the external proxy configured to route the transformed request based at least in part on the second domain corresponding to the second identity service.

2. The method of claim 1, further comprising, in accordance with a second determination that the entity is associated with the first domain corresponding to the first identity service, performing, by the first identity service, the entity operation.

3. The method of claim 1, wherein the first domain corresponding to the first identity service comprises first entity information for a first set of entities associated with a user account, and wherein the second domain corresponding to the second identity service comprises second entity information for a second set of entities associated with an additional user account.

4. The method of claim 3, wherein the second entity information comprises a uniform resource locator (URL) corresponding to the entity, and wherein transmitting the transformed request to the second identity service comprises routing the transformed request by the external proxy according to the URL.

5. The method of claim 1, further comprising:
generating a token corresponding to a user account associated with the request;
sending the token to the second identity service with the transformed request;
receiving, from the second identity service, an authorization request comprising the token;
identifying, based at least in part on the token, an access policy corresponding to the user account, the access policy comprising permission information; and
sending an authorization response to the second identity service, the authorization response comprising the permission information.

6. The method of claim 1, further comprising:
sending, to a requester associated with the request and responsive to the indication, a further indication that the entity operation was performed; and
storing the idempotency token.

7. The method of claim 6, wherein the idempotency token is a first idempotency token, and further comprising:
receiving a second request to perform a second entity operation, the second request comprising a second idempotency token;
determining, based at least in part on a comparison between the first idempotency token and the second idempotency token, whether the first idempotency token and the second idempotency are the same; and
in accordance with an additional determination that the first idempotency token and the second idempotency token are the same, sending, to a second requester associated with the second request, an indication that the second entity operation was performed.

8. The method of claim 1, further comprising:
receiving a second request to perform a second entity operation corresponding to the entity; and
sending, to a requestor associated with the second request, an indication to resend the second request after a time interval, the time interval determined based at least in part on a prior time interval between the request and the second request.

9. The method of claim 1, wherein the request comprises a request payload configured according to a first interface standard for the first identity service, and wherein the transformed request comprises a transformed request payload configured according to a second interface standard for the second identity service.

10. The method of claim 1, wherein the first identity service is implemented at a first identity service device, wherein the second identity service is implemented at a second identity service device, and wherein the external proxy is implemented at an external proxy device.

11. A distributed computing system comprising:
one or more processors; and
one or more memories storing computer-executable instructions that, when executed by the one or more processors, cause the distributed computing system to at least:
receive, by a first identity service of the distributed computing system, a request to perform an entity operation corresponding to an entity;
determine whether the entity is associated with a first domain corresponding to the first identity service or a second domain corresponding to a second identity service, the second domain associated with entities managed by the second identity service;
in accordance with a determination that the entity is associated with the second domain corresponding to the second identity service, transform the request to produce a transformed request;
determine whether the request comprises an idempotency token uniquely identifying the entity or the entity operation;
in accordance with a further determination that the request comprises the idempotency token, send, to the second identity service, an idempotency verification request;
receive, from the second identity service in response to the idempotency verification request, an indication that the entity corresponding to the entity operation does not exist at a device associated with the second identity service; and
transmit, via an external proxy, the transformed request to the second identity service, the external proxy configured to route the transformed request based at least in part on the second domain corresponding to the second identity service.

12. The distributed computing system of claim 11, wherein the one or more memories store additional computer-executable instructions that, when executed by the one or more processors, cause the distributed computing system to further, in accordance with a second determination that the entity is associated with the first domain corresponding to the first identity service, perform, by the first identity service, the entity operation.

13. The distributed computing system of claim 11, wherein the one or more memories store additional computer-executable instructions that, when executed by the one or more processors, cause the distributed computing system to further:
generate a token corresponding to a user account associated with the request;
send the token to the second identity service with the transformed request;
receive, from the second identity service, an authorization request comprising the token;
identify, based at least in part on the token, an access policy corresponding to the user account, the access policy comprising permission information; and
send an authorization response to the second identity service, the authorization response comprising the permission information.

14. The distributed computing system of claim 11, wherein the one or more memories store additional computer-executable instructions that, when executed by the one or more processors, cause the distributed computing system to further:

send, to a requester associated with the request and responsive to the indication, a further indication that the entity operation was performed; and store the idempotency token.

15. The distributed computing system of claim 14, wherein the idempotency token is a first idempotency token, and wherein the one or more memories store additional computer-executable instructions that, when executed by the one or more processors, cause the distributed computing system to further:

receive a second request to perform a second entity operation, the second request comprising a second idempotency token;

determine, based at least in part on a comparison between the first idempotency token and the second idempotency token, whether the first idempotency token and the second idempotency are the same; and in accordance with an additional determination that the first idempotency token and the second idempotency token are the same, send, to a second requester associated with the second request, an indication that the second entity operation was performed.

16. A non-transitory computer-readable medium storing computer-executable instructions that, when executed by one or more processors, cause a distributed computing system to at least:

receive, by a first identity service of the distributed computing system, a request to perform an entity operation corresponding to an entity;

determine whether the entity is associated with a first domain corresponding to the first identity service or a second domain corresponding to a second identity service, the second domain associated with entities managed by the second identity service;

in accordance with a determination that the entity is associated with the second domain corresponding to the second identity service, transform the request to produce a transformed request;

determine whether the request comprises an idempotency token uniquely identifying the entity or the entity operation;

in accordance with a further determination that the request comprises the idempotency token, send, to the second identity service, an idempotency verification request;

receive, from the second identity service in response to the idempotency verification request, an indication that the entity corresponding to the entity operation does not exist at a device associated with the second identity service; and transmit, via an external proxy, the transformed request to the second identity service, the external proxy configured to route the transformed request based at least in part on the second domain corresponding to the second identity service.

17. The non-transitory computer-readable medium of claim 16, storing additional computer-executable instructions that, when executed by the one or more processors, cause the distributed computing system to further, in accordance with a second determination that the entity is associated with the first domain corresponding to the first identity service, perform, by the first identity service, the entity operation.

18. The non-transitory computer-readable medium of claim 16, storing additional computer-executable instructions that, when executed by the one or more processors, cause the distributed computing system to further:

generate a token corresponding to a user account associated with the request;

send the token to the second identity service with the transformed request;

receive, from the second identity service, an authorization request comprising the token;

identify, based at least in part on the token, an access policy corresponding to the user account, the access policy comprising permission information; and send an authorization response to the second identity service, the authorization response comprising the permission information.

19. The non-transitory computer-readable medium of claim 16, storing additional computer-executable instructions that, when executed by the one or more processors, cause the distributed computing system to further:

send, to a requester associated with the request and responsive to the indication, a further indication that the entity operation was performed; and store the idempotency token.

20. The non-transitory computer-readable medium of claim 19, wherein the idempotency token is a first idempotency token, and storing additional computer-executable instructions that, when executed by the one or more processors, cause the distributed computing system to further:

receive a second request to perform a second entity operation, the second request comprising a second idempotency token;

determine, based at least in part on a comparison between the first idempotency token and the second idempotency token, whether the first idempotency token and the second idempotency are the same; and in accordance with an additional determination that the first idempotency token and the second idempotency token are the same, send, to a second requester associated with the second request, an indication that the second entity operation was performed.

* * * * *

UNITED STATES PATENT AND TRADEMARK OFFICE
CERTIFICATE OF CORRECTION

PATENT NO. : 12,229,297 B2
APPLICATION NO. : 17/953058
DATED : February 18, 2025
INVENTOR(S) : van den Dungen et al.

Page 1 of 1

It is certified that error appears in the above-identified patent and that said Letters Patent is hereby corrected as shown below:

On the Title Page

In page 2, Column 2, under Other Publications, Line 1, delete "Modemize" and insert -- Modernize --, therefor.

In page 2, Column 2, under Other Publications, Line 3, delete "modemize" and insert -- modernize --, therefor.

In page 2, Column 2, under Other Publications, Line 5, delete ""Modemize" and insert -- "Modernize --, therefor.

In the Specification

In Column 8, Line 41, delete "catchup." and insert -- catch up. --, therefor.

In Column 14, Line 39, delete "fora" and insert -- for a --, therefor.

In Column 28, Lines 19-20, delete "sub system," and insert -- subsystem, --, therefor.

Signed and Sealed this
Sixth Day of May, 2025

Coke Morgan Stewart
*Acting Director of the United States Patent and Trademark Office*